(12) United States Patent
Maheshwari

(10) Patent No.: US 8,549,832 B2
(45) Date of Patent: Oct. 8, 2013

(54) TURBOMACHINE NACELLE AND ANTI-ICING SYSTEM AND METHOD THEREFOR

(75) Inventor: Mahendra Maheshwari, Bel Air, MD (US)

(73) Assignee: MRA Systems Inc., Baltimore, MD (US)

( * ) Notice: Subject to any disclaimer, the term of this patent is extended or adjusted under 35 U.S.C. 154(b) by 803 days.

(21) Appl. No.: 12/649,387

(22) Filed: Dec. 30, 2009

(65) Prior Publication Data

US 2011/0167781 A1  Jul. 14, 2011

(51) Int. Cl.
*F02C 7/047* (2006.01)

(52) U.S. Cl.
USPC ... 60/39.093; 60/39.091; 60/779; 244/134 D; 244/134 R

(58) Field of Classification Search
USPC ............... 60/39.091, 39.093, 779; 137/15.2; 244/134 R, 134 A, 134 B, 134 D, 134 E, 244/134 C
See application file for complete search history.

(56) References Cited

U.S. PATENT DOCUMENTS

| 5,934,617 A | 8/1999 | Rutherford |
| 6,194,685 B1 | 2/2001 | Rutherford |
| 6,330,986 B1 | 12/2001 | Rutherford et al. |
| 6,732,502 B2 * | 5/2004 | Seda et al. .................... 60/226.1 |
| 7,629,558 B2 | 12/2009 | Petrenko |
| 2006/0155043 A1 * | 7/2006 | Johnson et al. ............... 524/495 |
| 2008/0179448 A1 * | 7/2008 | Layland et al. ............... 244/1 N |
| 2009/0277897 A1 | 11/2009 | Lashmore et al. |

* cited by examiner

*Primary Examiner* — William H Rodriguez
*Assistant Examiner* — Scott Walthour
(74) *Attorney, Agent, or Firm* — John Colligan; Gary M. Hartman; Domenica N. S. Hartman

(57) ABSTRACT

An anti-icing system and method for an aircraft engine nacelle. The nacelle has an inlet lip that defines a leading edge of the nacelle and has a cross-sectional shape and oppositely-disposed exterior and interior surfaces. An anti-icing system contacts at least the inlet lip of the nacelle. The anti-icing system includes at least one heating element having a cross-sectional shape that conforms to the cross-sectional shape of the inlet lip and in which carbon nanotubes are oriented and arranged to conduct electrical current through the heating element. Passing an electrical current through the heating element causes Joule heating of the heating element and heating of the inlet lip by thermal conduction.

13 Claims, 3 Drawing Sheets

TURBOMACHINE NACELLE AND ANTI-ICING SYSTEM AND METHOD THEREFOR

BACKGROUND OF THE INVENTION

The present invention relates to turbomachinery, and more particularly to anti-icing and de-icing systems for aircraft engine nacelles fabricated at least in part from composite materials.

High-bypass turbofan engines are widely used for high performance aircraft that operate at subsonic speeds. As schematically represented in FIG. 1, a high-bypass turbofan engine 10 includes a large fan 12 placed at the front of the engine 10 to produce greater thrust and reduce specific fuel consumption. The fan 12 serves to compress incoming air 14, a portion of which flows into a core engine (gas turbine) 16 that includes a compressor section 18 containing low and high pressure compressor stages 18A and 18B to further compress the air, a combustion chamber 20 where fuel is mixed with the compressed air and combusted, and a turbine section 22 where a high pressure turbine 22A extracts energy from the combustion gases to drive the high pressure stages 18B of the compressor section 18 and a low pressure turbine 22B extracts energy from the combustion gases to drive the fan 12 and the low pressure stages 18A of the compressor section 18. A larger portion of the air that enters the fan 12 is bypassed to the rear of the engine 10 to generate additional engine thrust. The bypassed air passes through an annular-shaped bypass duct 24 that contains one or more rows of stator vanes, also called outlet guide vanes 28 (OGVs), located immediately aft of the fan 12 and its fan blades 26. The fan blades 26 are surrounded by a fan cowling or nacelle 30 that defines the inlet duct 32 to the turbofan engine 10 as well as a fan nozzle 34 for the bypassed air exiting the bypass duct 24.

The nacelle 30 is an important structural component whose design considerations include aerodynamic criteria as well as the ability to withstand foreign object damage (FOD). For these reasons, it is important to select appropriate constructions, materials and assembly methods when manufacturing the nacelle 30. Various materials and configurations have been considered, with metallic materials and particularly aluminum alloys being widely used. Composite materials have also been considered, such as graphite-reinforced epoxy laminates, as they offer advantages including the ability to be fabricated as single-piece parts of sufficient size to meet aerodynamic criteria, contour control, and reduced weight, which promote engine efficiency and improve specific fuel consumption (SFC).

Aircraft engine nacelles are subject to icing conditions, particularly the nacelle leading edge at the inlet lip (36 of FIG. 1) while the engine is on the ground and especially under flight conditions. One well known approach to removing ice buildup (de-icing) and preventing ice buildup (anti-icing) on the nacelle inlet lip has been through the use of hot air bleed systems. An example is schematically represented in FIG. 1, in which engine-supplied bleed air flow is drawn from the combustion chamber 20 through piping 38 to the inlet lip 36, where the hot bleed air contacts the internal surface of the inlet lip 36 to heat the lip 36 and remove/prevent ice formation. The piping 38 includes a tube arrangement commonly referred to as a piccolo tube 40, which resides in an annular-shaped cavity of the nacelle 30 sometimes referred to as the D-duct 42. The tube 40 completely fills the D-duct 42 with the hot bleed air to ensure adequate heating of the inlet lip 36. While this type of system is effective, it requires a large amount of bleed air to fill the D-duct 42 and provide the thermal energy necessary to perform the anti-icing function. The hot air bled from the engine 10 results in a corresponding negative impact on engine performance and detracts from engine efficiency (SFC). Additionally, hot air bleed systems of the type represented can incur a significant weight penalty.

As an alternative, some smaller turbofans and turboprop aircraft engines have utilized electrical anti-icing systems that convert electrical energy into heat via Joule heating. Resistance-type heater wires can be used as the heating element, though a more recent example uses a flexible graphite material commercially available under the name GRAFOIL® from GrafTech International Holdings Inc. The heating element is embedded in a boot, such as a silicon rubber, which in turn is attached to the inside leading edge of the nacelle inlet lip. A drawback of such systems is that they typically require excessive energy for de-icing and continuous anti-icing operation on large aircraft engines, such as high-bypass turbofan engines of the type represented in FIG. 1. Furthermore, electrical anti-icing systems are relatively heavy and detract from engine efficiency/performance.

Still other options include "weeping" systems that release chemical de-icing agents, and de-icing boots equipped with inflatable bladders to crack ice buildup. Notable disadvantages of weeping systems include the high cost of chemical de-icing agents, the requirement that the aircraft carry the de-icing agent at all times, and the inoperability of the system if the supply of chemical agent is exhausted during flight. Disadvantages of de-icing boots include the requirement for a pump to inflate the bladders and a relatively short life span.

In view of the above, there are ongoing efforts to develop new technologies capable of providing de-icing and anti-icing functions while minimizing any negative impact on weight and power requirements, particularly with regard to the use of nacelles and other airfoil surfaces that are fabricated from composite materials to promote overall engine performance. However, the use of composite materials such as graphite-reinforced epoxy laminates in place of conventional aluminum alloy nacelles and wing structures poses additional challenges to anti-icing systems, since laminate composite materials exhibit relatively poor thermal conductivity in the thickness direction (and therefore between adjacent laminae), reducing the efficiency with which conventional anti-icing systems can heat the outer surfaces of a nacelle to remove and prevent ice buildup.

BRIEF DESCRIPTION OF THE INVENTION

The present invention provides a system and method for removing (de-icing) and preventing (anti-icing) ice buildup on aircraft engine nacelles, nonlimiting examples of which are nacelles partially or completely fabricated from composite materials.

According to a first aspect of the invention, the nacelle has an inlet lip that defines a leading edge of the nacelle and has a cross-sectional shape and oppositely-disposed exterior and interior surfaces. An anti-icing system contacts at least the inlet lip of the nacelle. The anti-icing system comprises at least one heating element having a cross-sectional shape that conforms to the cross-sectional shape of the inlet lip and in which carbon nanotubes are oriented and arranged to conduct electrical current through the heating element. The nacelle further comprises means for passing an electrical current through the heating element to cause Joule heating of the heating element and heating of the inlet lip by thermal conduction.

According to a second aspect of the invention, the above-described construction provides for a method capable of removing and preventing ice buildup on the inlet lip of a nacelle. Such a method entails fabricating the inlet lip to have a cross-sectional shape and oppositely-disposed exterior and interior surfaces, and contacting at least the inlet lip of the nacelle with an anti-icing system comprising at least one heating element having a cross-sectional shape that conforms to the cross-sectional shape of the inlet lip, and within which carbon nanotubes are oriented and arranged to conduct electrical current through the heating element. The method further entails passing an electrical current through the heating element to cause Joule heating of the heating element and heating of the inlet lip by thermal conduction.

A technical effect of this invention is the ability to provide an anti-icing system for an aircraft engine nacelle that contributes minimal weight to the engine, while also requiring minimal energy for its operation. Embodiments of the invention are also capable of improving the efficiency with which the exterior surface of the nacelle can be heated to remove and prevent ice buildup.

Other aspects and advantages of this invention will be better appreciated from the following detailed description.

DETAILED DESCRIPTION OF THE INVENTION

Figure 1:
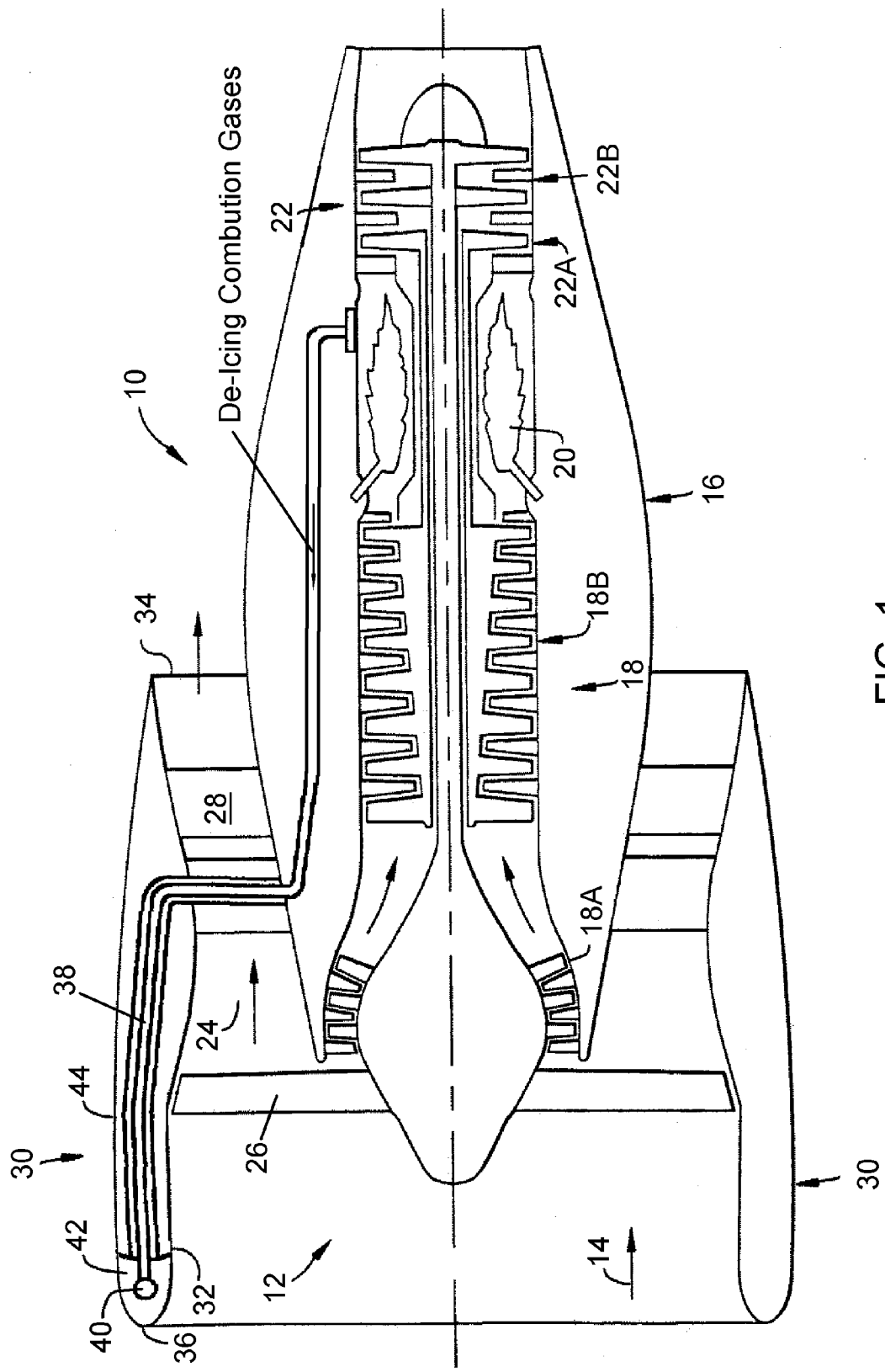
FIG. 1 schematically represents a cross-sectional view of a high-bypass turbofan engine.
Figure 2:
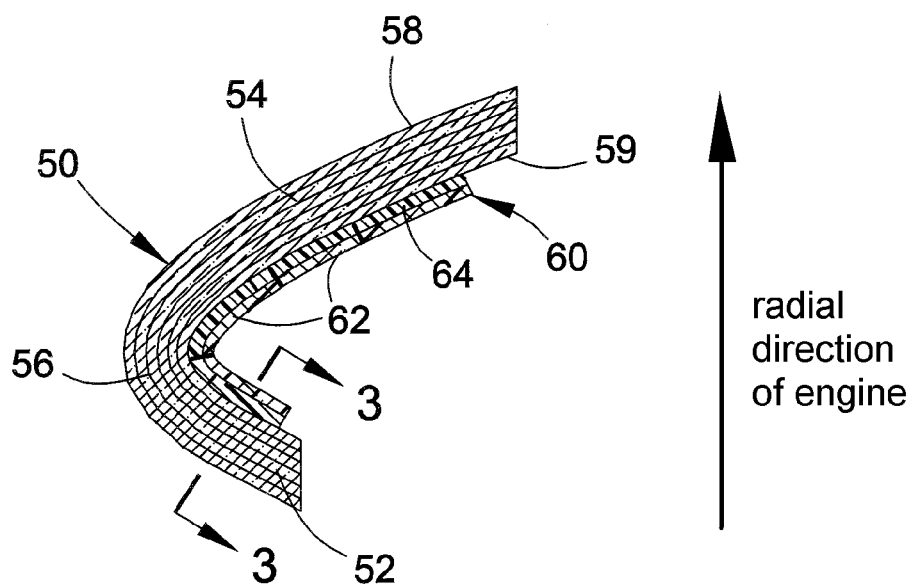
FIG. 2 is a detailed view showing a cross-section of a nacelle inlet lip of a turbofan engine in accordance with an embodiment of the invention.
Figure 4:
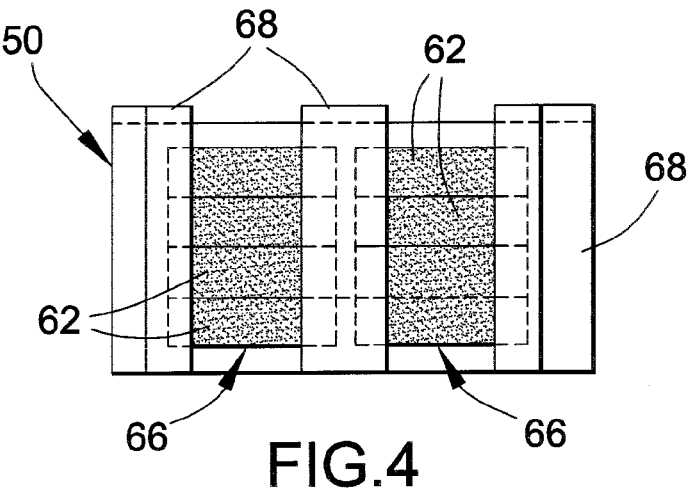
FIG. 4 is a detailed plan view of the nacelle inlet lip of FIG. 3.
Figure 5:
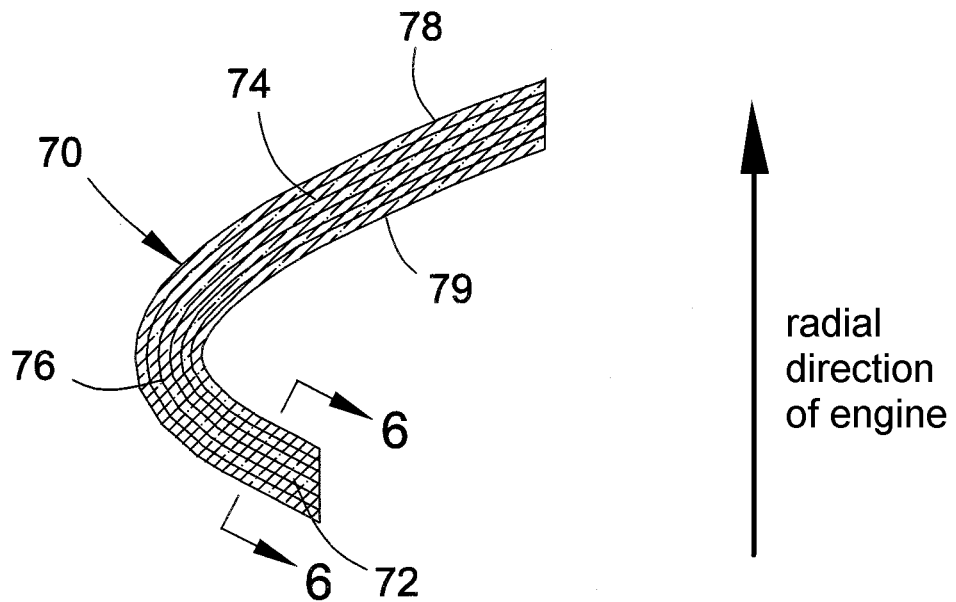
FIG. 5 is a detailed view showing a cross-section of a nacelle inlet lip of a turbofan engine in accordance with another embodiment of the invention.
Figure 6:
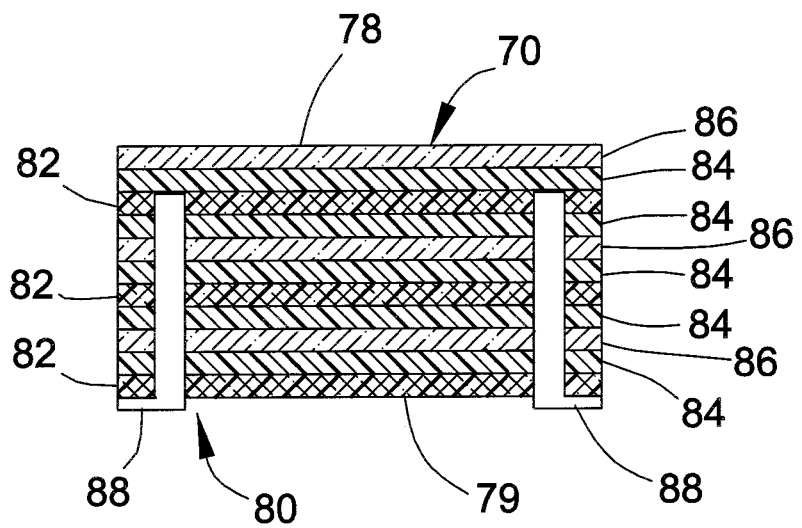
FIG. 6 is a detailed cross-sectional view of the nacelle inlet lip of FIG. 5.

FIGS. 2 through 6 represent two embodiments of the present invention by which an anti-icing and de-icing capability (hereinafter, simply referred to as anti-icing) is provided in combination with an aircraft engine nacelle 50 or 70, which may be manufactured so that at least its section at the inlet lip is fabricated from a composite material. The invention is particularly well suited for use in a high-bypass turbofan engine, an example of which is the turbofan engine 10 represented in FIG. 1, though it should be understood that other applications are foreseeable. For convenience, the invention will be described with reference to the engine 10 in FIG. 1, though modified to some extent by details of the invention described in reference to the embodiments of FIGS. 2 through 6, of which FIGS. 2 and 6 represent radial cross-sections of the inlet lip 36 along a radial direction of the engine 10 relative to its axis indicated in FIG. 1.

The nacelles 50 and 70 of FIGS. 2 through 6 can be formed of a variety of materials, including such conventional materials as metal alloys and particularly aluminum alloys. However, a preferred aspect of the invention is the ability to produce the nacelles 50 and 70, or at least the portions of the nacelles 50 and 70 that form their leading edges at the inlet lips 56 and 76, from a composite material. Preferred composite materials are believed to include composite laminates containing fabric or continuous fiber reinforcement materials and advanced matrix materials that exhibit sufficient temperature and impact resistance. The fiber reinforcement component of the composite material may be produced with known fiber materials to have a desired fiber architecture. For example, fabrics formed of carbon (graphite) fibers are believed to be a particularly suitable reinforcement material, though it is foreseeable that other fiber materials could be used in addition to or in place of carbon fibers. The fiber architecture can be produced using known fabric weaving and braiding techniques, including three-dimensional braiding or weaving techniques that are capable of promoting through-plane heat transfer through the thickness of the nacelles 50 and 70. The principal role of the matrix material in the composite is to contribute to the structural strength and other physical properties of the fiber reinforcement material as well as the composite structure as a whole. The matrix material should also be capable of curing at temperatures and under conditions that will not thermally degrade or otherwise be adverse to the fiber reinforcement material. On this basis, particularly suitable resin materials are believed to be thermoplastics such as poly(aryl)etheretherketone (PEEK), poly(aryl)etherketoneketone (PEKK), polyphenylene sulfide (PPS), and epoxies, though the use of other matrix materials is foreseeable.

According to another preferred aspect of the invention, at least the outer section of the nacelle inlet lip 56 and 76 is produced as a single piece to eliminate any steps or gaps that would interfere with laminar flow across its surface. More particularly, each of the nacelles 50 and 70 is preferably formed to have a continuous single-piece composite construction starting at its inlet lip 56 and 76 and continuing aftward to the portion defining the maximum diameter of the nacelle (identified by 44 in FIG. 1). Suitable methods for producing the nacelles 50 and 70 (or at least those portions formed of a composite material) include resin transfer molding (RTM), compression molding, autoclave curing, and vacuum-assisted resin transfer molding (VaRTM), which are well known for producing resin-impregnated laminate composite structures. Finally, it is within the scope of the invention to incorporate a core material (not shown), such as a lightweight foam or honeycomb polymeric material, within the laminate structure of the nacelles 50 and 70, as is common for aircraft engine nacelle components such as engine inlets, thrust reversers, core cowls, and transcowls, as well as other aerostructures including acoustic panels.

In view of the materials noted above, the nacelles 50 and 70 can be considerably lighter than nacelles formed of aluminum or other metal alloys conventionally used in the prior art. The thicknesses of the nacelles 50 and 70 should be sufficient to provide structural integrity without unnecessarily contributing weight. Though a wide range of thicknesses is possible, a suitable range is believed to be about 1.5 to about 2.5 millimeters.

As noted above, a particular aspect of the invention is to provide an anti-icing capability in combination with a composite nacelle of the type described above. With reference to FIG. 2, a cross-section of the nacelle 50 represents a first embodiment of the invention. As with the prior art nacelle 30 represented in FIG. 1, the nacelle 50 defines an inlet duct 52, outer barrel 54 and inlet lip 56 of the turbofan engine, as well as the bypass duct and fan nozzle (not shown in FIG. 2) through which bypassed air flows. As previously discussed, the nacelle 50 and more specifically its outer surface 58 is subject to icing conditions while the engine is on the ground and under flight conditions. The embodiment of FIG. 2 employs an anti-icing system 60 that includes heater strips 62 configured to provide localized heating of that portion of the nacelle 50 most susceptible to icing, namely, the exterior surface 58 at the inlet lip 56 and portions of the inlet duct 52 and outer barrel 54 just aft of the inlet lip 56. The anti-icing system 60 can be configured to have an annular shape corresponding to the shape of the nacelle 50 (as evident from FIG. 1). As represented in FIG. 2, the system 60 has a U-shaped cross-section closely conforming to the interior surface 59 of the nacelle 50 in the vicinity of the inlet lip 56 and adjacent portions of the inlet duct 52 and outer barrel 54.

According to a preferred aspect of the invention, the heater strips 62 comprise carbon nanotubes (CNTs), and more preferably a nonwoven textile (NWT) or woven textile (WT) of carbon nanotubes, such that each strip 62 is a unitary mat that can be handled, encapsulated or infiltrated, and bonded to the interior surface 59 of the nacelle 50. Importantly, the nanotubes are not randomly dispersed within the heater strips 62, but instead are deliberately oriented and arranged within each strip 62 to ensure they contact each other and enable the nanotubes to conduct electrical current, for example, in the lengthwise and/or widthwise directions of each strip 62. A particularly suitable nonwoven textile of carbon nanotubes has been developed by Nanocomp Technologies, Inc., of Concord, N.H., and is described in U.S. Published Patent Application No. 2009/0277897 to Lashmore et al. The contents of this published application relating to the composition, structure and fabrication of carbon nanotubes and textiles formed thereof are incorporated herein by reference. As reported in Lashmore et al., the carbon nanotubes can be single wall (SWNT), double wall (DWNT), or multiwall (MWNT), and individual carbon nanotubes can be produced and used in a range of diameters, for example, less than one nanometer to about ten nanometers, and a range of lengths, for example, up to about one millimeter or more. Lashmore et al. also report that sheets of nonwoven carbon nanotubes (and presumably woven carbon nanotubes) may be coated or infiltrated with a resin material, a nonlimiting example being furfuryl alcohol ($C_4H_3OCH_2OH$), using various known techniques to bond the nanotubes and optionally fill voids between nanotubes. According to the present invention, another possible coating/infiltrant is the resin used to form the matrix of the laminate nacelle 50. Carbon nanotube-based materials of the type described above are said to be capable of more efficiently generating heat than conventional resistive-heating materials such as copper wires, and can be utilized at higher power and voltage levels than copper wires having substantially equivalent mass or cross-sectional area, such that the heater strips 62 are capable of increased efficiency and greater thermal output.

Figure 3:
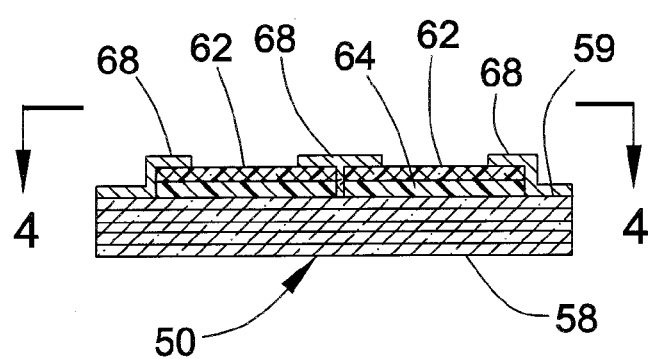
FIG. 3 is a detailed cross-sectional view of the nacelle inlet lip of FIG. 2.

FIGS. 3 and 4 represent the anti-icing system 60 as comprising multiple heater strips 62 arranged in parallel columns 66. The columns 66 of heater strips 62 can be configured to advantageously promote the flexibility of the anti-icing system 60 in planes parallel to the columns 66. As depicted in FIG. 2, the columns 66 can be arranged along radials of the nacelle 50 of FIG. 2 (corresponding to radial directions of the engine 10), promoting the ability of the anti-icing system 60 to closely conform to the contour of the interior surface 59 of the inlet lip 56. The strips 62 within each column 66 are shown as closely spaced and optionally touching each other, though gaps between adjacent strips 62 could be provided. The ends of the heater strips 62 are shown as connected by contacts 68 arranged so that, for example, current supplied to the contact 68 between the rows of strips 62 will flow through each strip 62 toward a corresponding one of the outer contacts 68. The contacts 68 can be formed in any suitable manner, including but not limited to deposition processes such as electroplating one or more conductive metals or metal alloys. As represented in FIG. 4, the contacts 68 preferably contact the entire width of each heater strip 62 to maximize the electrical contact and reduce the electrical interface resistance therebetween. To promote electrical contact between the contacts 68 and the heater strips 62, Lashmore et al. suggest that a coupling mechanism, such as a glassy carbon material, may be employed to enhance contact between the contacts 68 and the heater strips 62. In any event, sufficient power can be applied to the heater strips 62 by a suitable power source (not shown) to generate heat by Joule heating, which in turn causes heating of the inlet lip 56 by thermal conduction.

As represented in FIGS. 2 and 3, the anti-icing system 60 includes an electrical insulation layer 64 between the heater strips 62 and interior surface 59 of the nacelle 50 to electrically insulate the nacelle 50 from the current flowing through the heater strips 62. Because heat transfer to the nacelle 50 is through thermal conduction, the insulation layer 64 should be chosen to have a minimal impact on heat transfer (conduction) to the nacelle 50. As a nonlimiting example, polyamides are a class of polymeric materials that exhibit both electrical insulating properties and appreciable thermal conductivity, though those skilled in the art will be aware of various other potential materials for the insulation layer 64. The insulation layer 64 is preferably not more than 0.15 millimeter in thickness, more preferably about 0.05 to about 0.1 millimeter in thickness, such that the heater strips 62 are in close proximity to the nacelle 50. The anti-icing system 60 is shown as directly contacting the interior surface 59 of the nacelle 50 as a result of the heater strips 62 directly contacting the insulation layer 64, and the insulation layer 64 directly contacting the interior surface 59 of the nacelle 50.

Various techniques may be employed to attach or otherwise mount the anti-icing system 60 to the interior surface 59 of the nacelle 50. A preferred method is to apply a thin layer of a thermally conductive adhesive, though other methods are also within the scope of the invention. The entire anti-icing system 60 can have a relatively thin cross-section, preferably up to typical thicknesses for the nacelle 50, for example, about 3 millimeters or less, and therefore is capable of contributing minimal weight to the nacelle 50.

In an investigation leading to the present invention, a strip of nonwoven textile material having dimensions of about 1 inch by about 8.5 inches by about 0.06 inch (about 2.5×22× 0.15 cm) was formed from carbon nanotubes. Electrical contacts were formed at the longitudinal ends of the strip by attaching thin copper sheets using a conductive adhesive, crimping, or both. The strip was then bonded to a graphite-reinforced epoxy laminate with EPON 862 epoxy adhesive (Shell Chemical Company), with a 0.001 inch (about 25 micrometer) polyamide insulation layer separating the strip from the laminate to prevent electrical shorting. A range of voltages was then applied with a DC power source across the contacts. Temperature distribution of the strip-laminate assembly was measured with a thermal imaging camera and found to be generally uniform along the length of the strip (about 97.4° C.) and generally parabolic across the width of the laminate, with significant heating occurring in the laminate at distances from the strip of roughly half the width of the strip. From these results, it was concluded that a carbon nanotube strip would be very effective as an anti-icing heater element for a graphite-reinforced epoxy laminate, and could be significantly more efficient than existing heating elements of the prior art.

FIGS. 5 and 6 represent another embodiment for providing an anti-icing capability in combination with a composite nacelle 70. In contrast to the separate anti-icing system 60 of FIG. 2, the embodiment of FIGS. 5 and 6 represents an anti-icing system 80 incorporated into the laminate composite structure of the nacelle 70. Various aspects of the anti-icing system 80 of FIGS. 5 and 6 can be the same or similar to that described for the anti-icing system 60 of FIGS. 2 through 4, and as such the following description will focus only on the primary differences between the embodiments of FIGS. 2 through 4 and FIGS. 5 through 6.

In contrast to FIG. 2, the laminate construction of the nacelle 70 is represented as being made up of individual laminae 82, 84, and 86 (not to scale) of different compositions. As integral constituents of the laminate structure of the nacelle 70, all of the laminae 82, 84 and 86 have cross-sectional shapes that conform to the cross-sectional shape of the nacelle 70 in the region of its inlet lip 76. The lamina 86 located at the outer surface 78 of the nacelle 70 is preferably formed of a resin-impregnated fabric, such as a graphite-reinforced epoxy lamina. The nacelle 70 includes additional laminae 86 similar or identical to the lamina 86 located at the outer surface 78. These lamina 86 will be referred to as structural lamina 86 to indicate their primary structural role within the nacelle 70. Other lamina 82 within the laminate construction of the nacelle 70 will be referred to as heating lamina 82, indicating their primary role as associated with the anti-icing system 80 of FIGS. 5 and 6. FIG. 6 represents one of the heating laminae 82 as defining or otherwise located at the interior surface 79 of the nacelle 70, two other heating laminae 82 as entirely within the nacelle 70, and all three heating laminae 82 separated from the structural laminae 86 by a third type of lamina, referred to as an insulation lamina 84 that electrically insulates the heating laminae 82 from their adjacent structural laminae 86. As with the insulation layer 64 in the embodiment of FIGS. 2 through 4, the insulation lamina 84 can be formed of a material that exhibits suitably high electrical insulation properties and sufficiently high thermal conductivity at minimal thickness, for example, not more than 0.15 millimeter and more preferably about 0.05 to about 0.1 millimeter, so as not to significantly contribute to the weight of the nacelle 70.

It should be understood that the embodiment of FIGS. 5 and 6 is not limited to the particular number and arrangement of laminae 82, 84 and 86 shown in FIG. 6. Furthermore, as with the first embodiment, the laminate construction of the nacelle 70 may further contain a core material (not shown), such as a lightweight foam or honeycomb polymeric material, as discussed previously. The entire laminate nacelle 70 with its embedded anti-icing system 80 can have a cross-sectional thickness that is slightly greater than would otherwise be required in the absence of the heating laminae 82.

As with the heating strips 62 used in the embodiment of FIGS. 2 through 4, the heating laminae 82 preferably contain carbon nanotubes and are electrically connected to a suitable power source (not shown) to provide heating of the nacelle 70, or at least those portions of the nacelle 70 that contain the heating laminae 82 and are most susceptible to icing, namely, the inlet lip 76 and portions of the inlet duct 72 and outer barrel 74 just aft of the inlet lip 76. Also consistent with the previous embodiment, the laminae 82 may comprise non-woven textiles (NWT) or woven textiles (WT) of carbon nanotubes, such as those described in U.S. Published Patent Application No. 2009/0277897 to Lashmore et al. The laminae 82 can be infiltrated with the same epoxy resin matrix material as that used for the structural lamina 86, allowing the laminae 82 and 86 to be co-cured during curing of the laminate construction of the nacelle 70. Electrical contacts 88 are schematically represented as pins or probes that project through the layers of the laminate nacelle 70 to make electrical contact with at least the heating lamina 82 located at the interior surface 79 of the nacelle 70, and more preferably to make contact with each of the heating laminae 82 within the laminate construction of the nacelle 70. Sufficient power is applied to the contacts 88 to cause Joule heating of the carbon nanotube material within the heating laminae 82, which in turn causes heating of the inlet lip 76 by thermal conduction.

The embodiment of FIGS. 5 and 6 has the advantage of placing the heating laminae 82 within the laminate structure of the nacelle 70, and relying on the matrix material of the laminate structure to attach the heating laminae 82 to the nacelle 70. As a result, the heating laminae 82 are able to more efficiently heat the exterior surface 78 of the nacelle 70 to remove and prevent ice buildup. Furthermore, the nacelle 70 should be able to better resist delamination and fatigue fractures as compared to laminate structures in which wire mesh and flexible graphite material (for example, GRAFOIL®) have been incorporated. The matrix material of the laminate structure can also be used to provide electrical insulation between the heating laminae 82 and the remaining layers of the structure, further minimizing the additional weight contributed by the anti-icing system 80 to the nacelle 70. Other advantages believed to arise from the use of carbon nanotube layers in the laminate structure include greater in-plane and out-of-plane strength, and higher thermal degradation temperatures as compared to prior art heating elements such as wire meshes and flexible graphite materials.

While the invention has been described in terms of specific embodiments, other forms could be adopted by one skilled in the art. For example, the physical configuration of the turbofan engine 10 and nacelles 30, 50 and 70 could differ from those shown in the Figures, and materials and processes other than those noted could be used. Therefore, the scope of the invention is to be limited only by the following claims.

The invention claimed is:

1. A nacelle for installation at an inlet to an aircraft engine, the nacelle comprising:
    an inlet lip defining a leading edge of the nacelle and having a cross-sectional shape and oppositely-disposed exterior and interior surfaces, the inlet lip having a laminate construction from the interior surface to the exterior surface thereof, the laminate construction comprising a plurality of structural laminae and an anti-icing system;
    the anti-icing system defining the interior surface of the inlet lip and adapted to remove and prevent ice buildup on at least the inlet lip of the nacelle, the anti-icing system comprising a plurality of electrical insulation laminae and a plurality of heating elements within the laminate construction of the inlet lip, each of the additional heating elements being separated from the structural laminae of the inlet lip by the insulation laminae, each of the electrical insulation laminae and the heating elements having a cross-sectional shape that conforms to the cross-sectional shape of the inlet lip at the interior surface, the heating element comprising carbon nanotubes oriented and arranged to conduct electrical current through the heating element; and
    Means for passing an electrical current through the heating element to cause Joule heating of the heating element and heating of the inlet lip by thermal conduction from the interior surface to the exterior surface of the inlet lip.

2. The nacelle according to claim 1, wherein at least the inlet lip of the nacelle is a composite material.

3. The nacelle according to claim 1, wherein the heating elements are arranged in parallel columns, the heating elements have oppositely-disposed ends, the anti-icing system comprising electrical contacts that each contact more than one of the heating elements.

4. The nacelle according to claim 3, wherein the parallel columns of the heating elements are oriented to promote flexing of the anti-icing system in a plane parallel to the columns.

5. The nacelle according to claim 3, wherein the parallel columns of the heating elements are oriented along radials of the nacelle corresponding to radials of the engine.

6. The nacelle according to claim 1, wherein the heating element further comprises a matrix material that infiltrates the carbon nanotubes.

7. The nacelle according to claim 6, wherein the structural laminae comprise a reinforcement material infiltrated by a matrix material, and the matrix materials of the heating element and the laminate construction are the same.

8. The nacelle according to claim 1, wherein the nacelle is installed in the aircraft engine and surrounds a fan of the aircraft engine.

9. The nacelle according to claim 8, wherein the aircraft engine is a high-bypass gas turbine engine and the nacelle surrounds a high-bypass duct of the aircraft engine.

10. A method of removing and preventing ice buildup on an inlet lip that defines a leading edge of a nacelle of an aircraft engine, the method comprising:

fabricating the inlet lip to have a cross-sectional shape having oppositely-disposed exterior and interior surfaces and a laminate construction from the interior surface to the exterior surface thereof, the laminate construction comprising a plurality of structural laminae and an anti-icing system;

forming the anti-icing system to define the interior surface of the inlet lip and adapted to remove and prevent ice buildup on at least the inlet lip of the nacelle, the anti-icing system comprising a plurality of electrical insulation laminae and a plurality of heating elements within the laminate construction of the inlet lip, each of the additional heating elements being separated from the structural laminae of the inlet lip by the insulation laminae, each of the electrical insulation laminae and the heating elements having a cross-sectional shape that conforms to the cross-sectional shape of the inlet lip at the interior surface, the heating element comprising carbon nanotubes oriented and arranged to conduct electrical current through the heating element; and passing an electrical current through the heating element to cause Joule heating of the heating element and heating of the inlet lip by thermal conduction from the interior surface to the exterior surface of the inlet lip.

11. The method according to claim 10, further comprising forming at least the inlet lip of the nacelle of a composite material.

12. The method according to claim 10, wherein the heating elements are arranged in parallel columns to each have oppositely-disposed ends, the method further comprising depositing electrical contacts on the ends of the heating elements so that each of the electrical contacts is in electrical contact with more than one of the heating elements.

13. The method according to claim 10, further comprising installing the nacelle in the aircraft engine.

* * * * *